No. 725,254. PATENTED APR. 14, 1903.
H. JANDIN.
PISTON OR ROD PACKING.
APPLICATION FILED AUG. 6, 1901.
NO MODEL.
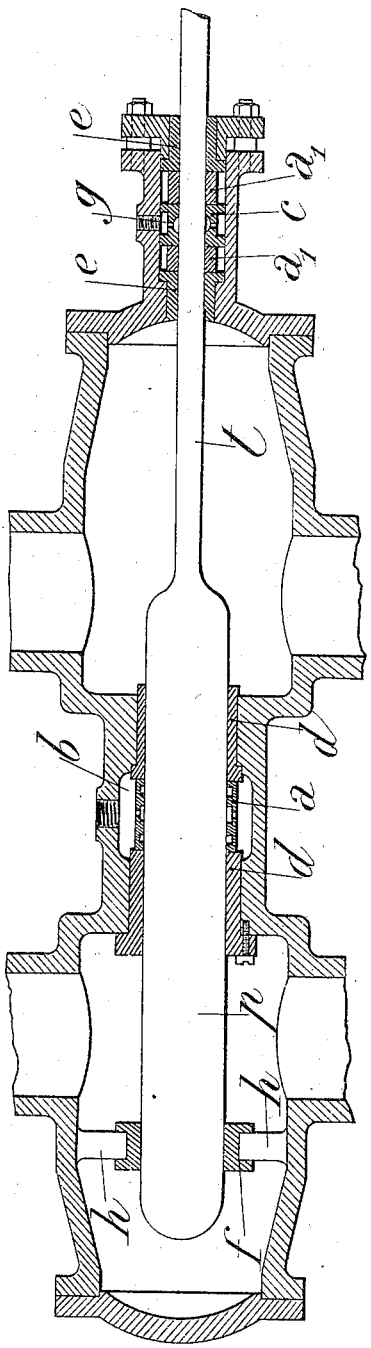
WITNESSES:
INVENTOR.
Henry Jandin
BY
Richardson
ATTORNEYS.

UNITED STATES PATENT OFFICE.

HENRY JANDIN, OF LYONS, FRANCE.

PISTON OR ROD PACKING.

SPECIFICATION forming part of Letters Patent No. 725,254, dated April 14, 1903.

Application filed August 6, 1901. Serial No. 71,027. (No model.)

*To all whom it may concern:*

Be it known that I, HENRY JANDIN, a citizen of France, residing at Lyons, France, have invented certain new and useful Improvements in Fittings or Packings for Pistons, Pump-Rods, and the Like, of which the following is a full, clear, and exact description and for which I have obtained patents in France, dated January 10, 1901, and in Belgium, dated January 14, 1901.

The fittings or packings forming the object of my invention are principally applicable to pistons known as "plungers" and to piston-rods, but are also applicable to like articles. They consist of sleeves or rings which exercise no pressure on the pistons or rods, but the combination of which nevertheless produces sufficient fluid-tightness with reduced friction and at the same time enables frictional surfaces to be lubricated while at work.

The accompanying drawing is a sectional view representing the application of the invention to fittings or packings of a double-acting plunger-piston and to its rod.

Tightness or hermeticity is obtained in all cases by a light ring $a$, bored to the diameter of the plunger-piston $p$, this ring being free around the piston and having a slight play between the fixed sleeves $d\ d$, which guide and support the piston. This hermetic ring is not necessarily single and may be replaced by two or more juxtaposed or separated rings. It results from this principle that this free ring not supporting the weight of the piston, being also light and exerting no grip on the piston, its wear is almost *nil*, and in any case less than that of the fixed sleeves supporting and guiding the plunger-piston, which wear by friction with the piston. Consequently when after a certain time of working the fixed sleeves supporting the plunger-piston have undergone some amount of wear and that the piston, in this case supposed to be horizontal, has lowered by consequence of this wear and of its weight, the hermetic fitting ring, on the contrary, remains concentric with the plunger-piston, and consequently forms a hermetic closure of the play or space produced above the piston and maintains hermeticity, which is thus obtained without pressure and with very little friction.

In the case of long-stroke plunger-pistons having no counter or second rod in order to avoid the employment of very long fixed fittings to guide them properly the above-described arrangement of sleeves is supplemented by an auxiliary sleeve $f$, supported within the body of the pump by isolated supports $h$, permitting the circulation of the liquid between the piston and the sides of the pump-body.

The invention further enables, in order to diminish friction, the lubrication of pistons to be effected during work by supplying a suitable liquid—for example, oil or more or less consistent grease—to the chamber $b$, containing the hermetic ring.

The fittings described for plunger-pistons are also suitable as fittings for rods, thus obviating the pressure of stuffing-boxes on the rods and permitting their lubrication.

The drawing shows an example of this application on the rod $t$ of the plunger-piston $p$. The hermetic ring or rings $a'$ are held with slight play between the two fixed sleeves $e\ e$, and the lubricating material is supplied to the chamber $g$ and thence to the lubricating-ring $c$, which in this example separates the two hermetic rings $a'\ a'$.

The hermetic rings $a'\ a'$ may be provided with interior grooves and with holes opening into these grooves for the introduction of the lubricating material.

The fixed sleeves $d\ d\ e\ e\ f$ may be provided with any suitable arrangements to facilitate their fixing in position and removal therefrom.

Having fully described my invention, what I claim, and desire to secure by Letters Patent, is—

In combination with a reciprocating rod, a packing-box or hermetic fitting comprising a casing, a pair of fixed sleeves and a ring bored to fit the rod closely and fitting endwise between the sleeves, said ring being of solid material and constituting one body, the said box having a space annularly arranged about the said closely-fitting ring, substantially as described.

In witness whereof I have hereunto set my hand in presence of two witnesses.

HENRY JANDIN.

Witnesses:
GASTON JEANNIAUX,
MARIN VACHON.